(12) United States Patent
Weng et al.

(10) Patent No.: US 6,608,142 B1
(45) Date of Patent: Aug. 19, 2003

(54) POLYVINYL CHLORIDE COMPOSITIONS

(75) Inventors: Dexi Weng, Franklin, MA (US); John Andries, E. Greenwich, RI (US); Keith G. Saunders, Cumberland, RI (US); Robert S. Brookman, Providence, RI (US)

(73) Assignee: Teknor Apex Company, Pawtucket, RI (US)

( * ) Notice: Subject to any disclaimer, the term of this patent is extended or adjusted under 35 U.S.C. 154(b) by 0 days.

(21) Appl. No.: 09/566,835

(22) Filed: May 8, 2000

(51) Int. Cl.$^7$ .............................................. C08L 27/04
(52) U.S. Cl. ........................ 525/214; 525/239; 525/240
(58) Field of Search .................................. 525/239, 240, 525/214

(56) References Cited

U.S. PATENT DOCUMENTS

| | | | |
|---|---|---|---|
| 3,673,167 A | 6/1972 | Ledoux et al. | 260/92.8 |
| 3,819,554 A | 6/1974 | Blanchard | 260/28.5 |
| 4,469,844 A | 9/1984 | Doak | 525/71 |
| 4,725,506 A * | 2/1988 | Nagano | 428/516 |
| 4,767,817 A * | 8/1988 | Lee | 524/494 |
| 5,026,798 A | 6/1991 | Canich | 526/127 |
| 5,110,647 A | 5/1992 | Sawada et al. | 428/43 |
| 5,272,236 A | 12/1993 | Lai et al. | 526/348 |
| 5,278,272 A | 1/1994 | Lai et al. | 526/348.5 |
| 5,380,786 A | 1/1995 | Greenlee et al. | 524/560 |
| 5,446,064 A | 8/1995 | Hori et al. | 524/536 |
| 5,550,190 A | 8/1996 | Hasegawa et al. | 525/92 |
| 5,552,481 A | 9/1996 | Galvez et al. | 525/74 |
| 6,093,772 A * | 7/2000 | Bussi | 524/504 |
| 6,204,334 B1 * | 3/2001 | Cinadr et al. | 525/239 |

FOREIGN PATENT DOCUMENTS

| | | | |
|---|---|---|---|
| EP | 0089182 A2 | 9/1983 | ........... C08L/51/00 |
| EP | 0472512 A2 | 2/1992 | ........... C08L/23/02 |
| GB | 227115 A | 4/1994 | ........... C08L/27/06 |
| JP | 57-179214 | 11/1982 | ......... C08F/259/00 |
| JP | 7-53819 | 2/1995 | ........... C08L/27/06 |
| WO | WO 9630447 A1 * | 10/1996 | ......... C08L/101/00 |

OTHER PUBLICATIONS

Rudin, A. The Elements of Polymer Science and Engineering, 2$^{nd}$ ed.; Academic Press: New York, 1999; pp 341–344.*

Locke et al., "Chlorinated Polyethylene Modification of Blends Derived from Waste Plastics Part II: Mechanism of Modification", Polymer Engineering and Science, Jul. 1973, vol. 13, No. 4, pp 308–318.

Paul et al., "The Potential for Reuse of Plastics Recovered from Solid Wastes", Polymer Engineering and Science, May, 1972, vol. 12, No. 3, pp. 157–166.

Engage (polyolefin elastomers brochure), published 1996, pp. 1–16.

* cited by examiner

Primary Examiner—James J. Seidleck
Assistant Examiner—Melanie Bissett
(74) Attorney, Agent, or Firm—Fish & Richardson P.C.

(57) ABSTRACT

Compositions of a polyvinyl chloride resin, a polyolefin which is the metallocene-catalyzed reaction product of ethylene and an alpha-olefin monomer, and a component selected from the group consisting of chlorinated polyethylene, polycaprolactone, and combinations thereof are disclosed. The compositions are essentially free of liquid plasticizers, and prossess good mechanical properties of tensile strength, elongation, and a low brittle point, even after being subjected to high heat for an extended period of time.

41 Claims, No Drawings

POLYVINYL CHLORIDE COMPOSITIONS

TECHNICAL FIELD

This invention relates to compositions of polyvinyl chloride resins and polyolefins that are essentially free of liquid plasticizers.

BACKGROUND

Various blends of polyvinyl chloride (PVC) resin are known. These blends, which are useful in numerous applications including wire and cable, medical devices, and automotive and appliance parts, often incorporate elastomers, e.g., nitrile rubber or flexible thermoplastics, e.g., polyurethane. Although blends containing these elastomers and thermoplastics exhibit enhanced physical properties, they also suffer from poor low temperature flexibility, inadequate heat resistance, poor weathering characteristics, mediocre processability, and relative high cost of production.

SUMMARY

In general, the invention relates to compositions of polyvinyl chloride (PVC) resins and thermoplastic elastomer polyolefins that are essentially free of liquid plasticizers. These compositions possess good physical properties, including high degree of elongation, favorable low temperature properties, and good thermal resistance and oxygen barrier properties. Such compositions can be used in numerous applications such as components of wire and cable, medical devices, and parts for automotive and other appliances.

In one aspect, the invention features a composition containing a PVC resin, a thermoplastic elastomer polyolefin which is a metallocene-catalyzed reaction product of ethylene and an alpha-olefin monomer (i.e., an ethylene-alpha-olefin copolymer such as ethylene-1-octene copolymer or ethylene-1-butene copolymer), and a component selected from the group consisting of chlorinated polyethylene, polycaprolactone, and combinations thereof. The PVC composition is essentially free of liquid plasticizers (for example, less than about 0.01 parts, e.g., less than about 0.001 parts, based upon 100 parts of the PVC resin).

In another aspect, the invention features a composition containing a PVC resin, a polyolefin which is a metallocene-catalyzed reaction product of ethylene and an alpha-olefin monomer, and a component selected from the group consisting of chlorinated polyethylene, polycaprolactone, and combinations thereof. The composition is essentially free of liquid plasticizers, and has an unaged (or original) brittle point no greater than $-30°$ C. and/or an elongation of at least 100%.

As used herein, a liquid plasticizer refers to a compound which, when added to a polymer, serves to soften the polymer. The compound is in the form of a liquid at ambient temperature. Examples of a liquid plasticizer include compounds such as phthalates (e.g., dioctyl, diisooctyl, or diheptylnonyl), and aliphatic ester adipates and sebacates (e.g., dioctyl adipate or sebacate).

Other features and advantages of the invention will be apparent from the following description of the preferred embodiments thereof, and from the claims.

DETAILED DESCRIPTION

A composition is provided that is essentially free of liquid plasticizers, and contains a PVC resin, a polyolefin which is a metallocene-catalyzed reaction product of ethylene and an alpha-olefin monomer, and a component selected from the group consisting of chlorinated polyethylene, polycaprolactone, and combinations thereof. The composition further optionally contains resins such as butyl rubber, ethylene-propylene-diene monomer rubber (EPDM), ethylene-propylene rubber (EPR), or combinations thereof, and/or additives such as lubricants, stabilizers, antioxidants, and fillers.

"Polyvinyl chloride" or "PVC," as used herein, includes homopolymers of vinyl chloride, as well as polymerization products of vinyl chloride and one or more co-monomers. For example, the PVC resin can be a copolymer of vinyl chloride and ethylene, or a copolymer of vinyl chloride and propylene. The PVC resin can also be the polymerization product of vinyl chloride and an ester monomer having the formula $H_2C=C(R^1)C(=O)OR^2$, where $R^1$ and $R^2$ are, independently, $C_{1-12}$alkyl. An example of such a resin is a copolymer of a vinyl chloride monomer and a methyl methacrylate monomer. These resins may be used alone or in combination.

The compositions are essentially free of liquid plasticizers, e.g., phthalates, trimelletates, pyromelletates, azelates, adipates, and the like.

The compositions contain a thermoplastic elastomer polyolefin which is a metallocene-catalyzed reaction product of ethylene and an alpha-olefin monomer. Preferred polyolefins include a copolymer of ethylene and 1-octene that is a metallocene-catalyzed reaction product of these two monomers, available from DuPont-Dow Elastomers under the trade name ENGAGE (e.g., ENGAGE 8150, ENGAGE 8440, and ENGAGE 8452). Another example of such a thermoplastic elastomer polyolefin is a copolymer of ethylene and 1-butene, available from Exxon Chemicals under the trade name EXACT 3035.

Preferably, the compositions contain at least about 5 parts, and more preferably from about 15 parts to about 65 parts, of the polyolefin that is a metallocene-catalyzed reaction product of ethylene and an alpha-olefin monomer (based on 100 parts by weight of the PVC resin).

The compositions also contain a component selected from the group consisting of chlorinated polyethylene (CPE), polycaprolactone, and any combinations thereof. The component improves the compatibility of the PVC resin and the polyolefin, thereby imparting desired mechanical properties to the resulting compositions.

Preferably, the compositions contain at least 20 parts, and more preferably from about 50 parts to about 150 parts, of the just-mentioned component (based on 100 parts by weight of the PVC resin).

When CPE is present in the compositions, it is preferred that the compositions contain at least 10 parts, more preferably from about 20 parts to about 60 parts, of CPE (based on 100 parts by weight of the PVC resin), and that the CPE has a chlorine content of about 5% to about 50% by weight. It is also preferred that the CPE is the chlorinated product of a slurry process. The chlorination process generally decreases the crystallinity of the material; it is preferred that the CPE has a residual polyethylene crystallinity of at least about 0.5% (measured by differential scanning calorimetry). Preferred CPE are commercially available, for example, from Dow Chemical under the trade name TYRIN 3623A.

When polycaprolactone is present in the compositions, it is preferred that the compositions contain at least 10 parts, more preferably from about 20 parts to about 100 parts, of polycaprolactone (based on 100 parts by weight of the PVC resin). Preferably, polycaprolactone present in the compositions has a molecular weight ranging from about 10,000 to about 60,000. An example of a preferred polycaprolactone is commercially available from Solvay under the trade name CAPA 640.

The PVC compositions may further contain one or more elastomers other than the just-described metallocene-catalyzed reaction products of ethylene and an alpha-olefin monomer. Examples of such elastomers include homopolymers (e.g., polyethylene or polypropylene) and copolymers (e.g., a copolymer of ethylene and propylene (EP rubber), a copolymer of ethylene, propylene, and a non-conjugated diene monomer (EPDM), a copolymer of ethylene and an alpha-olefin having at least 4 carbons, ethylene-propylene rubber (EPR), and butyl rubber (i.e., polyisobutene copolymer)). The elastomers may be used alone or in combination.

Preferably, the PVC compositions contain butyl rubber. When butyl rubber is present in the compositions, it is preferred that the compositions contain at least 5 parts, more preferably from about 20 parts to about 75 parts, of butyl rubber (based on 100 parts by weight of the PVC resin). Butyl rubber, which can be chlorinated or brominated, are commercially available, for example, from Exxon Chemical under the trade name BUTYL 065.

The PVC compositions may also contain ingredients such as lubricants, stabilizers, antioxidants, and fillers. Examples of suitable lubricants include stearic acid, metal salts of stearic acid, wax, and polyethylene glycols. The lubricants may be used alone or in combination. Preferred lubricants include stearic acid, available from Henkel Corporation as Stearic Acid GP Grade, and zinc stearate, available from the Norac Company under the trade name COAD 21.

Examples of suitable stabilizers include barium/zinc heat stabilizers, lead stabilizers, and organic heat stabilizers. The stabilizers may be used alone or in combination. Preferred stabilizers include a barium/zinc stabilizer, available from Witco under the trade name MARK 4782-A, and epoxidized soybean oil, available from Witco under the trade name E-54 EPO.

Examples of suitable antioxidants include phenolic and thioester antioxidants. The antioxidants may be used alone or in combination. A preferred antioxidant is tetrakis [methylene (3,5-di-t-butyl-4-hydroxylhydrocinnamate)] methane, available from Ciba Geigy under the trade name IRGANOX 1010.

Examples of suitable fillers include Kaolin clay, calcium carbonate, and other fillers commonly used in PVC compositions. The fillers may be used alone or in combination.

The preferred compositions exhibit an unaged (or original) brittle point of no greater than about −30° C., preferably, about −40° C. to about −70° C.; and an elongation of at least about 100%, preferably, about 100% to about 500%.

The compositions are generally prepared according to conventional dry blend or other methods known to those skilled in the art of PVC compounding.

The mixtures obtained from the blending process can be further compounded with a mixer such as a BANBURY® batch mixer, a Farrel Continuous Mixer, or a single or twin screw extruder.

The compositions are useful in a variety of applications. For example, these compositions are useful in applications in which it is desirable for compositions to maintain mechanical properties such as tensile strength, elongation, and a low brittle point, even when the compositions are subjected to high temperatures for extended periods of time. Such applications include wire and cable insulation and jacketing, garden hoses, medical devices, automotive parts, and construction materials.

In the following examples, the contents and properties of a number of preferred compositions were described. These compositions were prepared as follows. The ingredients were mixed in a BANBURY® internal mixer at 60 psi steam pressure, speed 5, for approximately 5 minutes, or until the temperature reached 330–360° F. The resultant mix was milled in a heated two-roll mill, then cooled to room temperature (25° C.). Test specimens were prepared according to ASTM protocols as follows. The cooled milled sheets were die cut into small pieces for injection molding. Test plaques were injection molded into 1/16"–1/8" step mold plaques in an Arburg 221-55-250 injection molding machine at temperatures of 160–190° C. ASTM test pieces were then die cut from the injection molded plaques. All tests were carried out according to the appropriate ASTM protocols.

Air circulating ovens were used to age the compositions; the temperature in the ovens was maintained at the desired setting, with a maximum ±0.2° C. variation. As used herein, the term "aged" means that a composition or a material that has been subjected to a heat treatment at a specified temperature for a specified time period.

EXAMPLES

Five compositions were prepared containing the following ingredients (based on 100 parts of polyvinyl chloride resin):

| INGREDIENT | Composition 1 | Composition 2[1] | Composition 3 | Composition 4 | Composition 5 |
|---|---|---|---|---|---|
| Polyvinyl Chloride Resin[2] | 100 | 100 | 100 | 100 | 100 |
| Heat Stabilizer[3] | 7 | 7 | 7 | 7 | 7 |
| Lubricant[4] | 1 | 1 | 1 | 1 | 1 |
| Antioxidant[5] | 1 | 1 | 1 | 1 | 1 |
| Chlorinated Polyethylene[6] | 40 | 40 | 40 | 40 | 40 |
| Butyl Rubber[7] | 70 | 70 | 0 | 0 | 70 |
| Polyolefin (1)[8] | 20 | 0 | 70 | 0 | 20 |
| Polyolefin (2)[9] | 0 | 0 | 0 | 70 | 30 |
| Polycaprolactone[10] | 30 | 30 | 30 | 30 | 0 |
| Processing Aid[11] | 2 | 2 | 2 | 2 | 2 |

-continued

| INGREDIENT | Composition 1 | Composition 2[1] | Composition 3 | Composition 4 | Composition 5 |
|---|---|---|---|---|---|
| Total (phr) | 271 | 251 | 251 | 251 | 271 |

[1]Composition 2 is a comparative example lacking polyolefin.
[2]OXY 200, commercially available from Occidental Chemical.
[3]A combination of MARK 1900 (4 parts) and Mark TS-607 (3 parts), commercially available from Witco
[4]Barium Stearate, commercially available from Witco.
[5]IRGANOX 1010, commercially available from Ciba Geigy.
[6]TYRIN 3623A (medium molecular weight, 36% chlorine content), commercially available from Dow Chemical Company.
[7]BUTYL 065, commercially available from Exxon Chemical.
[8]ENGAGE 8440, a metallocene-catalyzed polymerization product of ethylene and 1-octene (with melt flow index (dg/min) = 1.6), commercially available from DuPont-Dow Elastomers.
[9]ENGAGE EG-8150, a metallocene-catalyzed polymerization product of ethylene and 1-octene (with melt flow index (dg/min) = 0.5), commercially available from DuPont-Dow Elastomers.
[10]CAPA 640 ($T_m$ = 60° C.; m.w. = 37,000), commercially available from Solvay.
[11]Paraloid K-125, commercially available from Rohm & Haas Company.

The compositions exhibit the following physical properties (as tested according to the designated ASTM procedure):

| Test Description | ASTM procedure | Comp. 1 | Comp. 2 | Comp. 3 | Comp. 4 | Comp. 5 |
|---|---|---|---|---|---|---|
| Hardness (inst/15 sec) | D-2240 | C75/65 | C77/67 | C82/76 | C80/70 | C65/57 |
| Specific Gravity | D-297 | 1.14 | 1.15 | 1.16 | 1.14 | 1.10 |
| Oxygen Index (%) | D-2863 | 22 | 23 | 24 | 23 | 23 |
| Ultimate Elongation (%) | D-412 | 293 | 288 | 387 | 384 | 104 |
| Elongation Ret. (7 days at 136° C.) (%) | D-412 | 54 | 49 | 51 | 63 | 101 |
| Elongation Ret. (7 days at 158° C.) (%) | D-412 | 29 | 23 | 49 | 48 | 49 |
| Tensile at break (psi) | D-412 | 1876 | 1864 | 2605 | 2518 | 1686 |
| Tensile Ret. (7 days at 136° C.) (%) | D-412 | 116 | 137 | 117 | 108 | 113 |
| Tensile Ret. (7 days at 158° C.) (%) | D-412 | 121 | 130 | 116 | 106 | 111 |
| Tear Resistance (Die C) (pli) | D-1004 | 615 | 664 | 775 | 785 | 710 |
| Dielectric Constant (1 kHz) | D-150 | 3.01 | 3.58 | 3.17 | 3.27 | 2.87 |
| Dissipation Factor (1 kHz) | D-150 | N/A | 0.09227 | 0.02053 | 0.02005 | 0.01248 |
| Dielectric Constant (1 MHz) | D-150 | 2.76 | 2.85 | 2.89 | 2.91 | 2.61 |
| Dissipation Factor (1 MHz) | D-150 | 0.01687 | 0.02352 | 0.02293 | 0.02465 | 0.01694 |
| Melt Flow Rate (177° C./5,000 g) (g/10 min) | D-3364 | 1.6 | 1.5 | 205 | 1.1 | 1.4 |
| Brittle Point (Original) (° C.) | D-746 | −42 | −31 | −58 | −59 | −46 |
| Brittle Point (136° C./7 days) (° C.) | D-746 | −34 | −36 | <−60 | <−60 | −49 |
| Brittle Point (158° C./7 days) (° C.) | D-746 | −19 | >0 | −44 | −44 | −43 |

In the above table, elongation retention is defined as $E_{aged}/E_{original}$. The value for the original elongation ($E_{original}$) is measured before the composition is aged; the value for the aged elongation ($E_{aged}$) is measured after the composition has been subjected to treatment at the specified temperature for the specified time period. Ideally, a heat resistant PVC composition exhibits an elongation retention of 100%. The closer this value is to 100%, the more heat resistant the composition is.

Similarly, tensile strength retention is defined as tensile strength$_{aged}$/tensile strength$_{original}$, where the value for tensile strength$_{original}$ is measured before aging, and the value for tensile strength$_{aged}$ is measured after the composition has been subjected to treatment at the specified temperature for the specified time period. Ideally, a heat resistant PVC composition has a tensile strength retention of 100%. The closer this value is to 100%, the more heat resistant the composition is.

The brittle point is the temperature below which a composition becomes brittle, rather than ductile and flexible. Ideally, a composition that will be subjected to high and low temperatures has a brittle point that does not become higher when the composition is aged.

As the above table illustrates, the preferred compositions have good mechanical properties such as tensile strength and elongation, and also a low brittle point after aging.

Other embodiments are within the following claims.

What is claimed is:

1. A composition comprising:
   (a) polyvinyl chloride resin;
   (b) a thermoplastic elastomer polyolefin which is the metallocene-catalyzed reaction product of ethylene and an alpha-olefin monomer; and
   (c) a component, wherein the component is a combination of a chlorinated polyethylene and a polycaprolactone, wherein said composition is essentially free of liquid plasticizers; wherein essentially all of the thermoplastic elastomer polyolefin consists of a metallocene-catalyzed reaction product of ethylene and an alpha-olefin monomer; and wherein the amount of said thermoplastic elastomer polyolefin is between about 15 and about 70 parts per 100 parts polyvinyl chloride resin and the amount of said component is between about 40 and about 150 parts per 100 parts polyvinyl chloride resin.

2. A composition according to claim 1, wherein said alpha-olefin monomer is 1-octene.

3. A composition according to claim 1, further comprising an elastomer selected from the group consisting of butyl rubber, ethylene-propylene-diene monomer rubber, ethylene-propylene rubber, and combinations thereof.

4. A composition according to claim 1, further comprising butyl rubber.

5. A composition according to claim 1, wherein the amount of said thermoplastic elastomer polyolefin is between about 15 and about 65 parts per 100 parts polyvinyl chloride resin.

6. A composition according to claim 1, wherein the amount of said component is at between about 50 and about 150 parts per 100 parts polyvinyl chloride resin.

7. A composition according to claim 1, wherein said composition has a brittle point no greater than about −30° C.

8. A composition according to claim 1, wherein said composition has an elongation of at least about 100%.

9. A composition according to claim 7, said composition has an elongation of at least about 100%.

10. A composition according to claim 7, further comprising an elastomer selected from the group consisting of butyl rubber, ethylene-propylene-diene monomer rubber, ethylene-propylene rubber, and combinations thereof.

11. A composition according to claim 7, further comprising butyl rubber.

12. A composition according to claim 1, wherein the amount of said thermoplastic elastomer polyolefin is between about 50 and about 70 parts per 100 parts polyvinyl chloride.

13. A composition according to claim 1, wherein the amount of said component is between about 40 and about 70 parts per 100 parts polyvinyl chloride resin.

14. A composition according to claim 12, wherein the amount of said component is between about 40 and about 70 parts per 100 parts polyvinyl chloride resin.

15. A composition according to claim 14, wherein said composition has a brittle point no greater than about −30° C.

16. A composition according to claim 1, wherein said composition has a brittle point of between about −40° C. and about −60° C.

17. A method of preparing a composition, comprising obtaining a thermoplastic elastomer polyolefin which is the metallocene-catalyzed reaction product of ethylene and an alpha-olefin monomer; and blending said thermoplastic elastomer polyolefin with a polyvinyl chloride resin and a component, wherein the component is a combination of a chlorinated polyethylene and a polycaprolactone; wherein said composition is essentially free of liquid plasticizers; wherein essentially all of the thermoplastic elastomer polyolefin consists of a metallocene-catalyzed reaction product of ethylene and an alpha-olefin monomer; and wherein the amount of said thermoplastic elastomer polyolefin is between about 15 and about 70 parts per 100 parts polyvinyl chloride resin and the amount of said component is between about 40 and about 150 parts per 100 parts polyvinyl chloride resin.

18. The method of claim 17, wherein said alpha-olefin monomer is 1-octene.

19. The method of claim 17, said composition having a brittle point of about −30° C.

20. A composition comprising:
    (a) polyvinyl chloride resin;
    (b) a thermoplastic elastomer polyolefin which is the metallocene-catalyzed reaction product of ethylene and an alpha-olefin monomer; and
    (c) polycaprolactone,
        wherein said composition is essentially free of liquid plasticizers; and wherein the amount of said thermoplastic elastomer polyolefin is between about 15 and about 70 parts per 100 parts polyvinyl chloride resin and the amount of said caprolactone is between about 10 and about 100 parts per 100 parts polyvinyl chloride resin.

21. A composition according to claim 20, wherein said alpha-olefin monomer is 1-octene.

22. A composition according to claim 20, further comprising an elastomer selected from the group consisting of butyl rubber, ethylene-propylene-diene monomer rubber, ethylene-propylene rubber, and combinations thereof.

23. A composition according to claim 20, further comprising butyl rubber.

24. A composition according to claim 20, wherein the amount of said thermoplastic elastomer polyolefin is between about 15 and about 65 parts per 100 parts polyvinyl chloride resin.

25. A composition according to claim 20, wherein the amount of said thermoplastic elastomer polyolefin is between about 50 and about 70 parts per 100 parts polyvinyl chloride.

26. A composition according to claim 20, wherein said composition contains about 50 to about 150 parts polycaprolactone per 100 parts polyvinyl chloride resin.

27. A composition according to claim 20, wherein said composition contains about 40 to about 70 parts polycaprolactone per 100 parts polyvinyl chloride resin.

28. A composition according to claim 20, wherein said composition has a brittle point no greater than about −30° C.

29. A composition according to claim 20, wherein said composition has a brittle point of between about −40° C. and about −60° C.

30. A composition according to claim 20, wherein said composition has an elongation of at least about 100%.

31. A method of preparing a composition, comprising:
    (a) obtaining a thermoplastic elastomer polyolefin which is the metallocene-catalyzed reaction product of ethylene and an alpha-olefin monomer; and
    (b) blending said thermoplastic elastomer polyolefin with a polyvinyl chloride resin and polycaprolactone, wherein said composition is essentially free of liquid plasticizers; and wherein the amount of said thermoplastic elastomer polyolefin is between about 15 and about 70 parts per 100 parts polyvinyl chloride resin and the amount of said caprolactone is between about 10 and about 100 parts per 100 parts polyvinyl chloride resin.

32. A method according to claim 31, wherein said alpha-olefin monomer is 1-octene.

33. A method according to claim 31, wherein said composition further comprises an elastomer selected from the group consisting of butyl rubber, ethylene-propylene-diene monomer rubber, ethylene-propylene rubber, and combinations thereof.

34. A method according to claim 31, wherein said composition further comprises butyl rubber.

35. A method according to claim 31, wherein the amount of said thermoplastic elastomer polyolefin is between about 15 and about 65 parts per 100 parts polyvinyl chloride resin.

36. A method according to claim 31, wherein the amount of said thermoplastic elastomer polyolefin is between about 50 and about 70 parts per 100 parts polyvinyl chloride.

37. A method according to claim 31, wherein said composition contains about 50 to about 150 parts polycaprolactone per 100 parts polyvinyl chloride resin.

38. A method according to claim 31, wherein said composition contains about 40 to about 70 parts polycaprolacone per 100 parts polyvinyl chloride resin.

39. A method according to claim 31, wherein said composition has a brittle point no greater than about −30° C.

40. A method according to claim 31, wherein said composition has a brittle point of between about −40° C. and about −60° C.

41. A method according to claim 31, wherein said composition has an elongation of at least about 100%.

* * * * *